US007734998B2

(12) United States Patent
Petri (10) Patent No.: US 7,734,998 B2
(45) Date of Patent: Jun. 8, 2010

(54) MINIMIZING ACCESSES TO A REPOSITORY DURING DOCUMENT RECONSTITUTION IN A CONTENT MANAGEMENT SYSTEM

(75) Inventor: John Edward Petri, Lewiston, MN (US)

(73) Assignee: International Business Machines Corporation, Armonk, NY (US)

(*) Notice: Subject to any disclaimer, the term of this patent is extended or adjusted under 35 U.S.C. 154(b) by 718 days.

(21) Appl. No.: 11/684,136

(22) Filed: Mar. 9, 2007

(65) Prior Publication Data

US 2008/0222506 A1 Sep. 11, 2008

(51) Int. Cl.
*G06F 17/30* (2006.01)
*G06F 17/22* (2006.01)

(52) U.S. Cl. .................. 715/208; 715/205; 715/234

(58) Field of Classification Search .............. 715/208, 715/205, 234
See application file for complete search history.

(56) References Cited

U.S. PATENT DOCUMENTS

| 6,842,757 | B1 | 1/2005 | Winer et al. | |
|---|---|---|---|---|
| 7,219,299 | B2* | 5/2007 | Fields et al. | 715/205 |
| 2003/0009563 | A1* | 1/2003 | Douglis et al. | 709/227 |
| 2003/0061305 | A1* | 3/2003 | Copley et al. | 709/217 |
| 2005/0021997 | A1* | 1/2005 | Beynon et al. | 713/200 |
| 2006/0026510 | A1* | 2/2006 | Boag et al. | 715/522 |
| 2006/0156220 | A1* | 7/2006 | Dreystadt et al. | 715/501.1 |

OTHER PUBLICATIONS

O'Callahan, Robert, "Offline Web Applications" Well I'm Back,, http://weblogs.mozillazine.org/roc/archives/2007/02/offline_web_app.html, Feb. 14, 2007, captured Jan. 15, 2010.*
Juima.org,"Forcing object fallback in IE" Just Imagine . . . the world blushing prettily . . . , Nov. 16, 2006, http://weblog.juima.org/showpost.asp?postid=3780, captured Jan. 15, 2010.*
PCT International Report on Patentability for Application PCT/EP2008/051611, Sep. 15, 2009.*
"XML Inclusions (XInclude) Version 1.0 (Second Edition)", Nov. 15, 2006, pp. 1-24 URL: http://www.w3.org/TR/xinclude/>.
Harold, E R et al, "XLinks and XPointers", Nov. 20, 2002 URL: http://www.cafeconleche.org/slides/sd2002east/xlinks/XLinksandXPointers.html>.
Derose, S et al, "XML Linking Language (XLink) Version 1.0" URL: http://www.w3.org/TR/2001/REC-xlink-20010627>.

* cited by examiner

*Primary Examiner*—Stephen S Hong
*Assistant Examiner*—Michael Scott
(74) *Attorney, Agent, or Firm*—Martin & Associates, LLC (57) ABSTRACT

A content management system (CMS) provides a way to minimize accesses to a repository when reconstituting a document. When a document is first reconstituted, the CMS reads links in the document, reads the corresponding objects from the repository, then stores the values of those objects in fallback elements in the document. In addition, a list is generated that provides both original links to the objects in the repository and voidable links to those object, and the document is then modified, if needed, to reference the voidable links. When the document needs to be subsequently reconstituted, the repository is queried to determine which of the objects corresponding to the original links have not changed since the last reconstitution. If the object has not changed, the voidable link in the list is invalidated for the object, causing the fallback element to be used without accessing the repository.

15 Claims, 6 Drawing Sheets

```
<LinkBase xmlns:xlink="http://www.w3.org/1999/xlink" xlink:type="extended">
    <EndPoint xlink:type="locator" xlink:href="score://ref:child1" label="child1_ref"/>
    <EndPoint xlink:type="locator" xlink:href="score://obj_id:29839" label="child1_actual"/>
    <EndPoint xlink:type="locator" xlink:href="score://ref:child2" label="child2_ref"/>
    <EndPoint xlink:type="locator" xlink:href="score://obj_id:29840" label="child2_actual"/>
    <EndPoint xlink:type="locator" xlink:href="score://ref:child3" label="child3_ref"/>
    <EndPoint xlink:type="locator" xlink:href="score://obj_id:29841" label="child3_actual"/>
    <EndPoint xlink:type="locator" xlink:href="score://ref:child4" label="child4_ref"/>
    <EndPoint xlink:type="locator" xlink:href="score://obj_id:29842" label="child4_actual"/>
    <Link xlink:type="arc" xlink:from="child1_ref" xlink:to="child1_actual" actuate="onLoad"/>
    <Link xlink:type="arc" xlink:from="child2_ref" xlink:to="child2_actual" actuate="onLoad"/>
    <Link xlink:type="arc" xlink:from="child3_ref" xlink:to="child3_actual" actuate="onLoad"/>
    <Link xlink:type="arc" xlink:from="child4_ref" xlink:to="child4_actual" actuate="onLoad"/>
</LinkBase>
```

```
<LinkBase xmlns:xlink="http://www.w3.org/1999/xlink" xlink:type="extended">
    <EndPoint xlink:type="locator" xlink:href="score://ref:child1" label="child1_ref"/>
    <EndPoint xlink:type="locator" xlink:href="score://obj_id:29839" label="child1_actual"/>
    <EndPoint xlink:type="locator" xlink:href="score://ref:child2" label="*child2_null*"/>
    <EndPoint xlink:type="locator" xlink:href="score://obj_id:29840" label="child2_actual"/>
    <EndPoint xlink:type="locator" xlink:href="score://ref:child3" label="*child3_null*"/>
    <EndPoint xlink:type="locator" xlink:href="score://obj_id:29841" label="child3_actual"/>
    <EndPoint xlink:type="locator" xlink:href="score://ref:child4" label="child4_ref"/>
    <EndPoint xlink:type="locator" xlink:href="score://obj_id:29842" label="child4_actual"/>
    <Link xlink:type="arc" xlink:from="child1_ref" xlink:to="child1_actual" actuate="onLoad"/>
    <Link xlink:type="arc" xlink:from="*child2_null*" xlink:to="child2_actual" actuate="onLoad"/>
    <Link xlink:type="arc" xlink:from="*child3_null*" xlink:to="child3_actual" actuate="onLoad"/>
    <Link xlink:type="arc" xlink:from="child4_ref" xlink:to="child4_actual" actuate="onLoad"/>
</LinkBase>
```

MINIMIZING ACCESSES TO A REPOSITORY DURING DOCUMENT RECONSTITUTION IN A CONTENT MANAGEMENT SYSTEM

BACKGROUND

1. Technical Field

This disclosure generally relates to content management systems, and more specifically relates to a content management system that minimizes accesses to a repository during document reconstitution.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content is checked by the CMS to make sure the content conforms to predefined rules. A user may also check out content from the repository, or link to content in the repository while generating content. The rules in a CMS assure that content to be checked in or linked to meets desired criteria specified in the rules.

Known content management systems check their rules when content is being checked in. If the rule is satisfied, the content is checked into the repository. If the rule is not satisfied, the content is not checked into the repository. Known content management systems may include rules related to bursting, synchronization and linking. Bursting rules govern how a document is bursted, or broken into individual chunks, when the document is checked into the repository. By bursting a document into chunks, the individual chunks may be potentially reused later by a different author. Synchronization rules govern synchronization between content and metadata related to the content. For example, a synchronization rule may specify that whenever a specified CMS attribute is changed, a particular piece of XML in the content should be automatically updated with that attribute's value. Linking rules govern what content in a repository a user may link to in a document that will be subsequently checked into the repository.

When a document is created and initially checked into a repository, the CMS typically analyzes the document in light of any defined bursting rules, and may burst many different portions of the document. Bursting means that one or more portions of the document are stored as objects in the repository, and each portion of the document that was bursted is then replaced in the document with a link to the object in the repository. By bursting content in a document to an object in the repository, that content is readily available for reuse later on.

If bursting rules are defined that aggressively burst many portions of documents as the documents are checked in, there may become a large number of objects in the repository that the CMS must manage. As the number of objects grows, the performance of the CMS in processing those objects necessarily slows down. Accessing the repository for each and every bursted object when a document is reconstituted may result in an excessive number of accesses to the repository, which may greatly decrease performance. Without a way to reduce the number of accesses to a repository in a CMS when a document is being reconstituted, the computer industry will continue to suffer from excessive overhead in a CMS when a large number of objects are bursted and need to be retrieved from a repository when a document is reconstituted.

BRIEF SUMMARY

A content management system (CMS) provides a way to minimize accesses to a repository when reconstituting a document. When a document is first reconstituted, the CMS reads links in the document, reads the corresponding objects from the repository, then stores the values of those objects in fallback elements in the document. In addition, a list is generated that provides both original links to the objects in the repository and voidable links to those objects, and the document is then modified, if needed, to reference the voidable links. When the document needs to be subsequently reconstituted, the repository is queried to determine which of the objects corresponding to the original links have not changed since the last reconstitution. If the object has not changed, the voidable link in the link list is invalidated for the object, causing the fallback element to be used without accessing the repository. The result is the fallback elements in the document become a cache for the objects that have not changed, while the objects that have changed are still accessed in the repository. This minimizes the accesses to the repository during reconstitution of a document, thereby improving system performance.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and.

DETAILED DESCRIPTION

The claims and disclosure herein provide a content management system (CMS) that minimizes accesses to the repository during reconstitution of a document. When a document is initially reconstituted, the objects are retrieved from the repository, and the values of the objects are stored in fallback elements in the document. A list of links is then created that provides both original links and voidable links to the objects. The document is modified, if needed, to reference the voidable links. When the document is reconstituted after the initial reconstitution, the original links in the document are determined from the list, and the repository is queried to determine which of the objects corresponding to the original links have not changed since the last reconstitution. For any object that has not changed since the last reconstitution, the voidable link to that object is invalidated. As a result, the voidable link in the document will not be valid when the document is reconstituted, causing the CMS to use the fallback element instead. In essence, the fallback elements in the document serve as a cache for objects that have not changed. For objects that have changed, their voidable links are left intact so these objects may be accessed in the repository.

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

Figure 1:
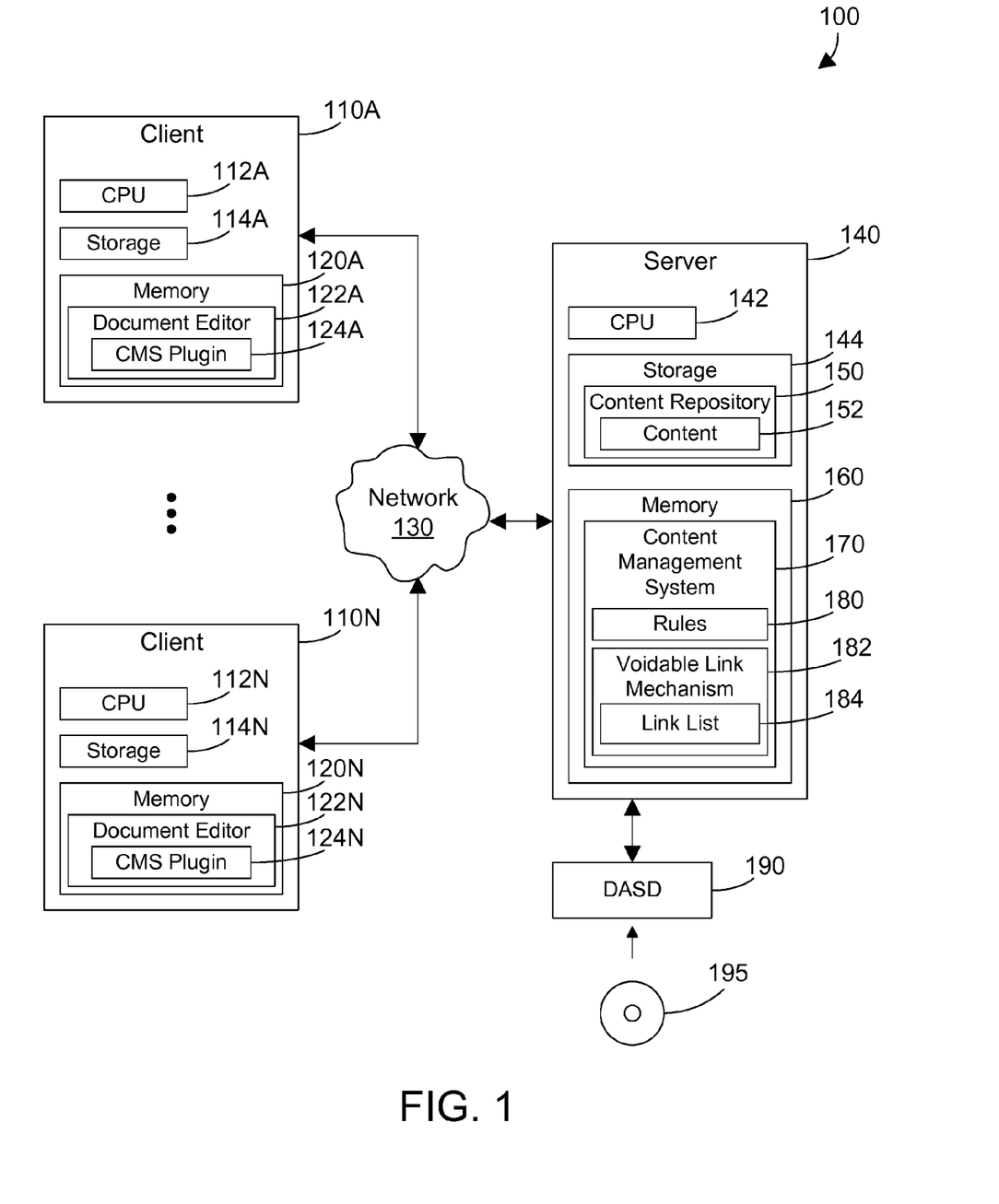
FIG. 1 is a block diagram of a networked computer system that includes a server computer system that has a content management system that includes a voidable link mechanism that minimizes accesses to a repository during document reconstitution.

Referring to FIG. 1, networked computer system 100 includes multiple clients, shown in FIG. 1 as clients 110A, . . . , 110N, coupled to a network 130. Each client preferably includes a CPU, storage, and memory that contains a document editor and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes rules 180 and a voidable link mechanism 182. Voidable link mechanism 182 analyzes a document during its initial reconstitution, retrieves all of the linked objects from the repository, and modifies the document to include fallback elements that have the values retrieved from the repository. In addition, the voidable link mechanism 182 modifies the document, if needed, to reference voidable links in the link list 184. The link list 184 includes the original links that are referenced in the document, and maps the original links to corresponding voidable links. Once the document is initially reconstituted and changed as described above, subsequent reconstitutions of the document will minimize accesses to the repository. When the document needs to be reconstituted after the initial reconstitution, the original links are read from the link list for the document. The repository is then queried to determine which of the objects corresponding to the original links have not changed since the last reconstitution. For each object that has not changed since the last reconstitution, the voidable link to that object is invalidated. As a result, when the CMS processes a voidable link to an object in the repository that has changed, it accesses the corresponding object in the repository. When the CMS processes a voidable link to an object in the repository that has not changed, the invalidation of the object's voidable link results in the link being invalid. As a result, the CMS uses the fallback element instead. Because the object's data from the last time the document was reconstituted was stored in the fallback element, the fallback element essentially serves as a cache if the object has not changed.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, . . . , 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

Embodiments herein may also be delivered as part of a service engagement with a client corporation, nonprofit organization, government entity, internal organizational structure, or the like. These embodiments may include configuring a computer system to perform some or all of the methods described herein, and deploying software, hardware, and web services that implement some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
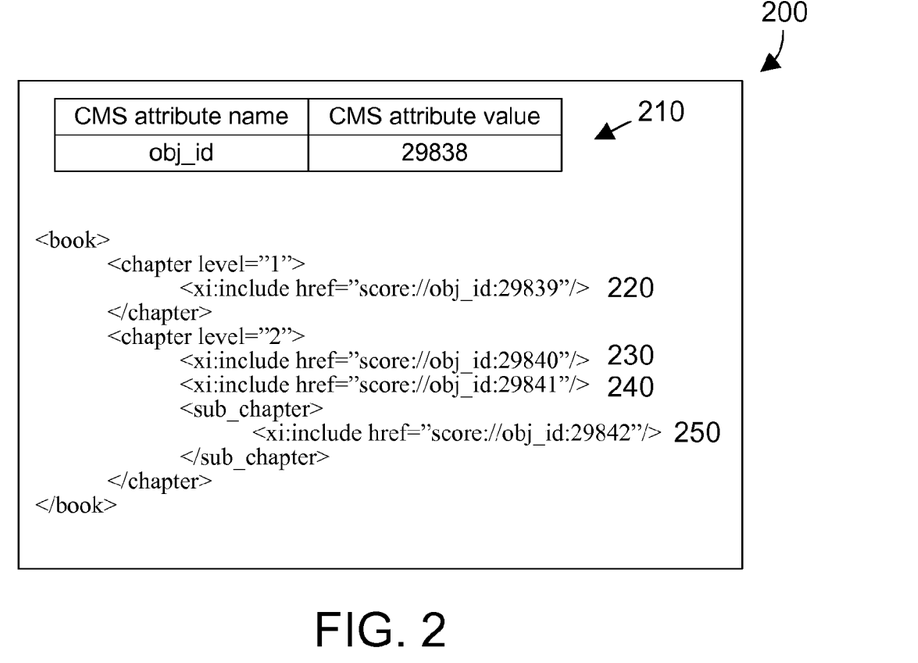
FIG. 2 shows a sample XML document stored as an object in a repository, where the document includes many links to other objects in the repository.

Referring to FIG. 2, a sample document 200 that has been stored in the repository of a content management system is shown. Document 200 includes a header portion 210 that includes an attribute called obj_id that uniquely identifies the document 200 to the content management system. The value for obj_id is 29838. This simple document includes a book element that includes two chapter elements. The first chapter element includes an XInclude element 220 that specifies to import an object from the repository at this location in the document. The object to be imported is specified in the XInclude element 220, namely the object with obj_id of 29839. In similar fashion, the second chapter element includes three XInclude elements at 230, 240 and 250. XInclude element 230 specifies to import the object from the repository that has an obj_id of 29840 to the location of the XInclude element 230. In similar fashion, XInclude element 240 specifies to import the object from the repository that has an obj_id of 29841 to the location of the XInclude element 240, and XInclude element 250 specifies to import the object from the repository that has an obj_id of 29842 to the location of the XInclude element 250. Document 200 thus includes four links to objects in the repository. We assume for this example these links in FIG. 2 were generated as a result of bursting that occurred when initially checking document 200 into the repository. However, the disclosure and claims herein expressly extend to any kind of link, whether automatically generated during bursting or expressly specified by an author.

Figure 3:
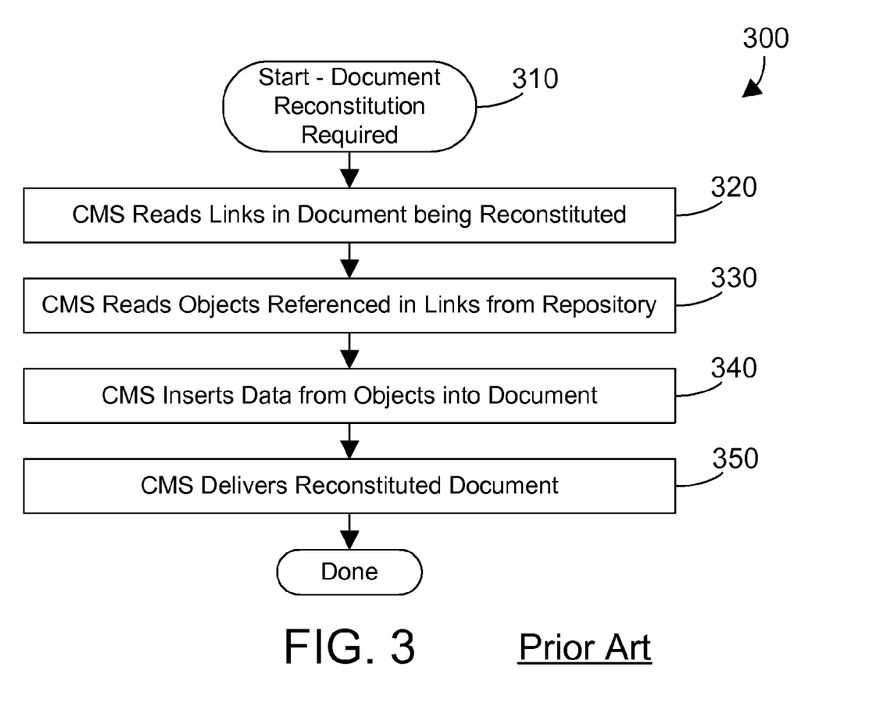
FIG. 3 is a flow diagram of a prior art method for reconstituting a document stored in the repository.

Referring to FIG. 3, a prior art method 300 begins when document reconstitution is required (step 310). We assume method 300 is performed for document 200 in FIG. 2. The CMS reads the links in the document being reconstituted (step 320). This means the XInclude elements at 220, 230, 240 and 250 are read in step 320. The CMS then reads the objects referenced in the links from the repository (step 330). This means that all four objects 29839, 29840, 29841 and 29842 are read from the repository in step 330. The CMS then inserts the data from these objects at their corresponding insertion points in the document as defined by the XInclude elements 220, 230, 240 and 250 (step 340). The CMS then delivers the reconstituted document (step 350). In prior art method 300 in FIG. 3, the CMS always reads all objects in all links from the repository in step 330. When bursting is done aggressively, thereby creating a relatively large number of chunks, reading each chunk from the repository each time a document is reconstituted can cause performance penalties.

The disclosure and claims herein prevent the need for reading all objects from the repository during document reconstitution. This is done in a two-step process. First, a document goes through initial processing when it is first reconstituted. Second, once the initial processing is complete, subsequent reconstitutions may be performed without necessarily accessing all of the document's linked objects in the repository. This two-step process is described in detail below.

Figure 4:
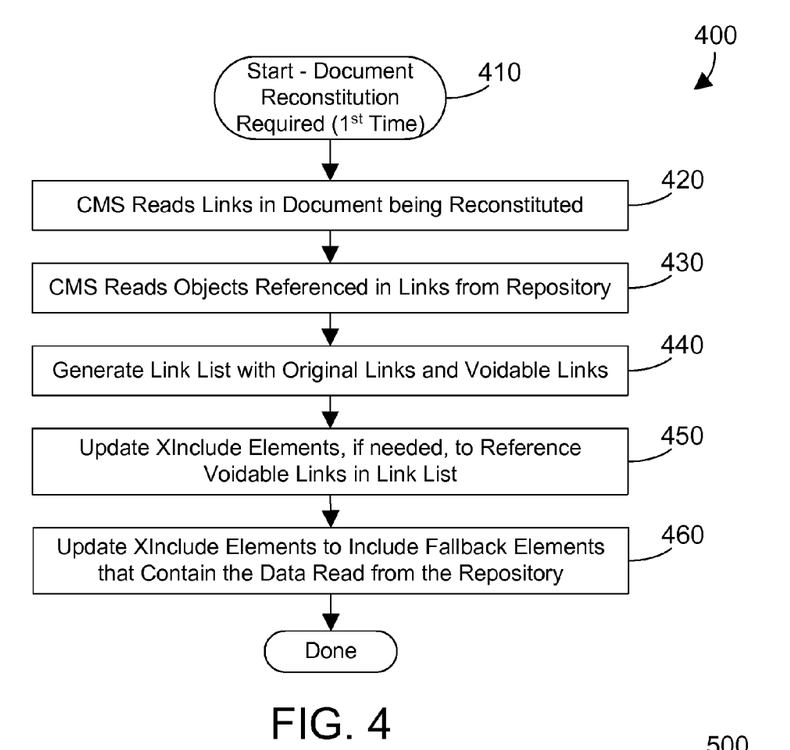
FIG. 4 is a flow diagram of a method for initially reconstituting a document.

Referring to FIG. 4, a method 400 begins when a document is reconstituted for the first time (step 410). Note that the term "first time" does not necessarily mean the very first time the document is ever reconstituted. To the contrary, a document could be reconstituted many times in a prior art CMS before being initially reconstituted as discussed herein. In the disclosure and claims herein, the terms "first time" and "initial reconstitution" refer to the first time the document is processed by the voidable link mechanism 182 in FIG. 1 in preparation to minimize accesses to the repository. The CMS reads the links in the document being reconstituted (step 420). Again using document 200 as an example, step 420 reads the four XInclude elements at 220, 230, 240 and 250. The CMS then reads the objects referenced in the links from the repository (step 430). Thus, objects 29839, 29840, 29841 and 29842 are read from the repository in step 430. A link list is then created with original links and voidable links (step 440). The XInclude elements in the document are then updated, if needed, to reference a corresponding voidable link in the link list (step 450). If an original link is already voidable, it may not need to be updated in step 450. The XInclude elements are then updated to include fallback elements that contain the data read from the repository (step 460). Note that method 400 in FIG. 4 is preferably performed by the voidable link mechanism 182 in FIG. 1.

A fallback element is a feature provided by the XML Inclusions (XInclude) standard that allows specifying content to include at an XInclude element if the link in the XInclude element cannot be resolved. A fallback element thus provides default content that may be used when the link is invalid (e.g., cannot be resolved to the repository). This feature is used herein not to provide default content in a traditional sense, which is normally static, but to instead provide a cache feature for data retrieved from the repository. By writing data retrieved from the repository during the initial reconstitution to the respective fallback elements in the document, the data from these objects is effectively cached in the fallback elements.

Figure 5:
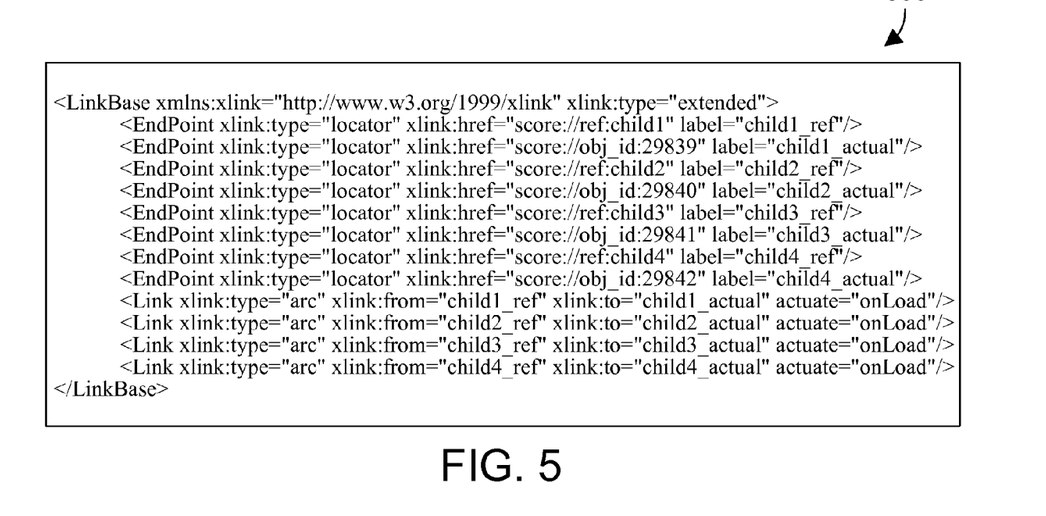
FIG. 5 shows a linkbase created for the document in FIG. 2 in step 440 in FIG. 4 that includes both original links and corresponding voidable links.

A linkbase 500 is shown in FIG. 5 as one suitable implementation of a link list that could be generated in step 440 in FIG. 4 for sample document 200 in FIG. 2. A linkbase is a structure for storing relationships between links. In the specific example in FIG. 5, linkbase 500 is an XLink Linkbase which is an XML document that conforms to a defined XLink linkbase structure. Linkbase 500 provides both original links and voidable links for accessing objects in the repository. In linkbase 500, the first two lines within the LinkBase element specifies a child1_ref voidable link and child1_actual that is a link to the object 29839 originally specified in the document, and is therefore an original link.

The next two lines specify the voidable link child2_ref and the child2_actual original link to the object 29840. The next two lines specify the voidable link child3_ref and the child3_actual original link to the object 29841. The next two lines specify the voidable link child4_ref and the child4_actual original link to the object 29842. The last four lines within the LinkBase element specify a "from-to" mapping of voidable links to original links. Thus, the child1_ref is specified as a voidable link that is mapped to the child1_actual original link. In similar fashion, child2_ref is specified as a voidable link that is mapped to the child2_actual original link; child3_ref is specified as a voidable link that is mapped to the child3_actual original link; and child4_ref is specified as a voidable link that is mapped to the child4_actual original link.

Linkbase 500 is a convenient way to allow invalidating voidable links in a way that all original links are still available. A voidable link may be invalidated in the linkbase 500 without affecting the original links. The significance of this feature is explained in more detail below.

Figure 6:
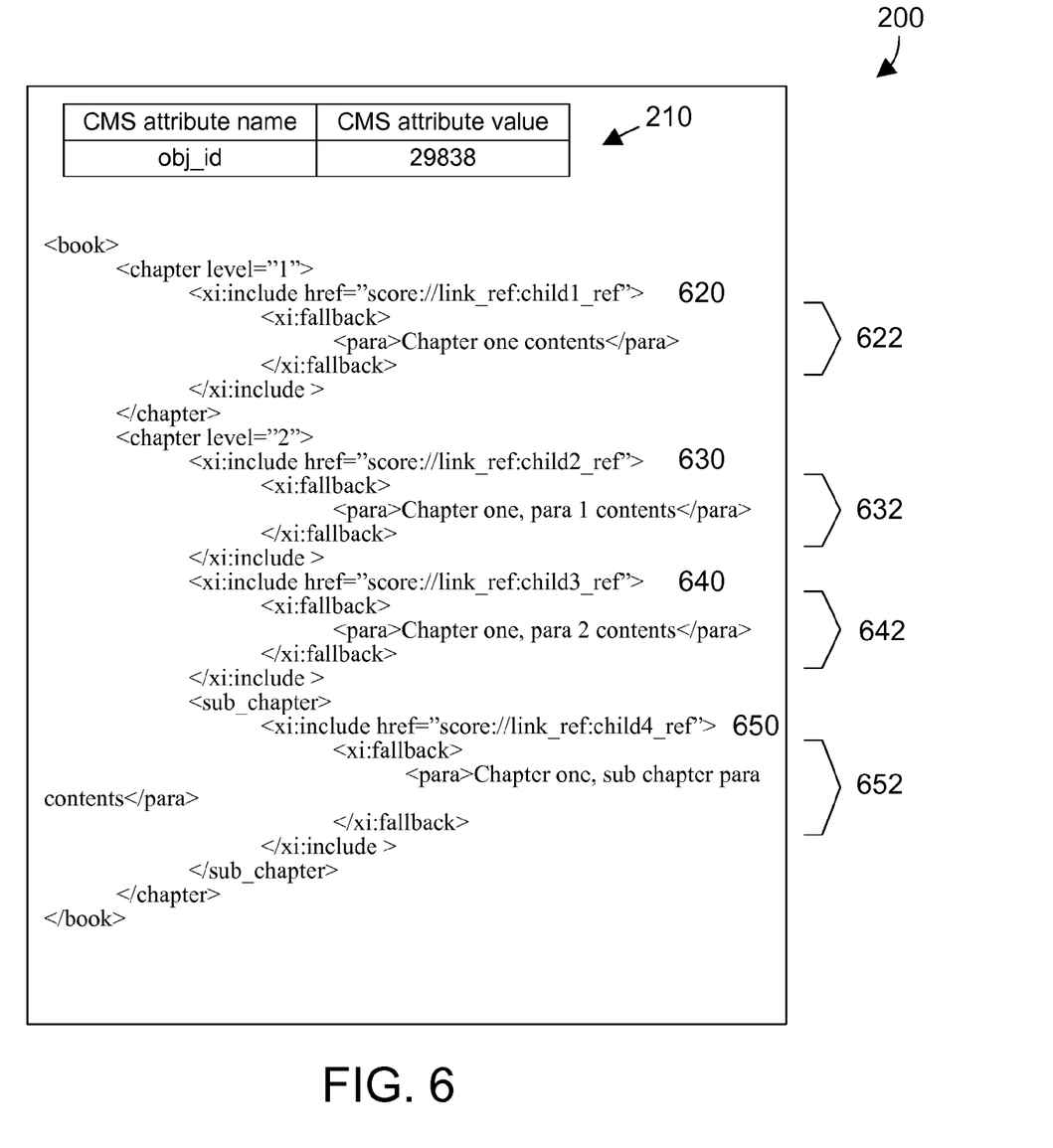
FIG. 6 shows the document 200 in FIG. 2 after modifying the links to reference the voidable links in the linkbase, and after adding values for the fallback elements.

FIG. 6 shows the document 200 in FIG. 2 after updating the XInclude elements to reference the voidable links in the linkbase 500 in FIG. 5 in step 450 of FIG. 4 and after updating the XInclude elements to include the fallback elements that contain data that was read from the repository in step 460 in FIG. 4. The voidable links have been added at 620, 630, 640 and 650. The fallback elements that contain the data read from the corresponding objects in the repository are shown at 622, 632, 642 and 652 in FIG. 6. Once the document has been initially reconstituted using method 400 in FIG. 4, accesses to the repository may be minimized in subsequent reconstitutions of the document. Method 400 in FIG. 4 represents the first step in the two-step process that modifies the document in a way that allows minimizing accesses to the repository in subsequent document reconstitutions.

Figure 7:
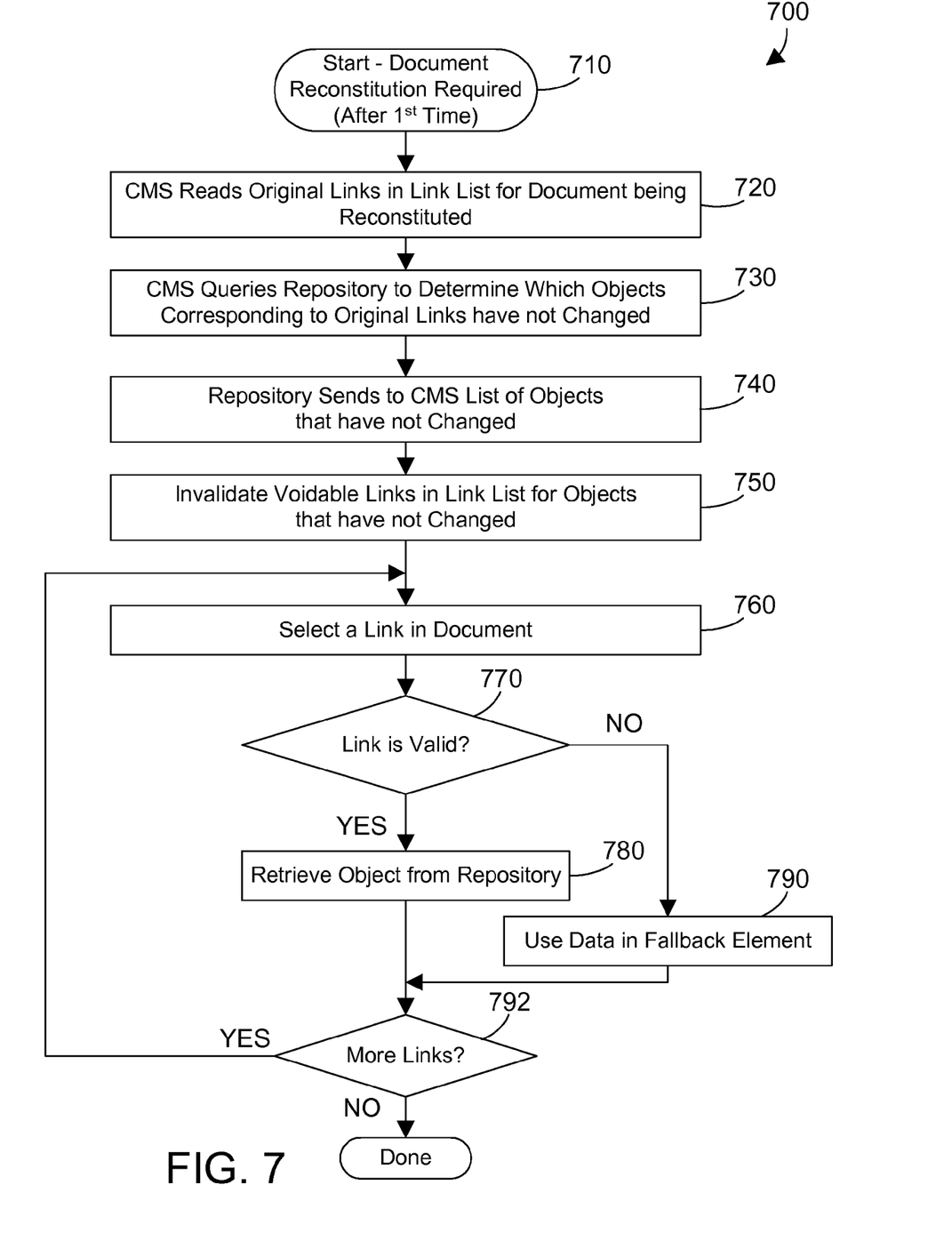
FIG. 7 is a flow diagram of a method for subsequent reconstitutions of a document that has already been initially reconstituted by executing method 400 in FIG. 4.

Referring to FIG. 7, a method 700 represents the second step in the two-step process for minimizing accesses to the repository during document reconstitution. Method 700 begins when document reconstitution is required (step 710), after method 400 in FIG. 4 (the first step) has been performed. The CMS reads the original links in the link list for the document being reconstituted (step 720). The CMS queries the repository to determine which of the objects corresponding to the original links in the document have not changed since the last reconstitution of the document (step 730). Determining which objects have not changed is a much quicker process than actually reading the objects because a very small data structure can represent the change state of all of the objects in the repository that correspond to a given document. The repository then sends to the CMS a list of which objects in the repository have not changed since the last reconstitution of the document (step 740). The CMS invalidates the voidable links that correspond to objects that have not changed (step 750). A link in the document is then selected (step 760). If the link is valid (step 770=YES), the object corresponding to the link is retrieved from the repository (step 780). A link is valid if it resolves to an original link in the link list. If the link is not valid (step 770=NO), we know from the action taken in step 750 that the object has not changed since the last reconstitution of the document, so the data in the fallback element is the same as the data in the repository. As a result, the data in the fallback element may be used (step 790) without making an access to the repository. If there are more links to process (step 792=YES), method 700 loops back to step 760 and continues until there are no more links to process (step 792=NO), at which point method 700 is done. Note that method 700 in FIG. 7 is preferably performed by the voidable link mechanism 182 in FIG. 1.

Figure 8:
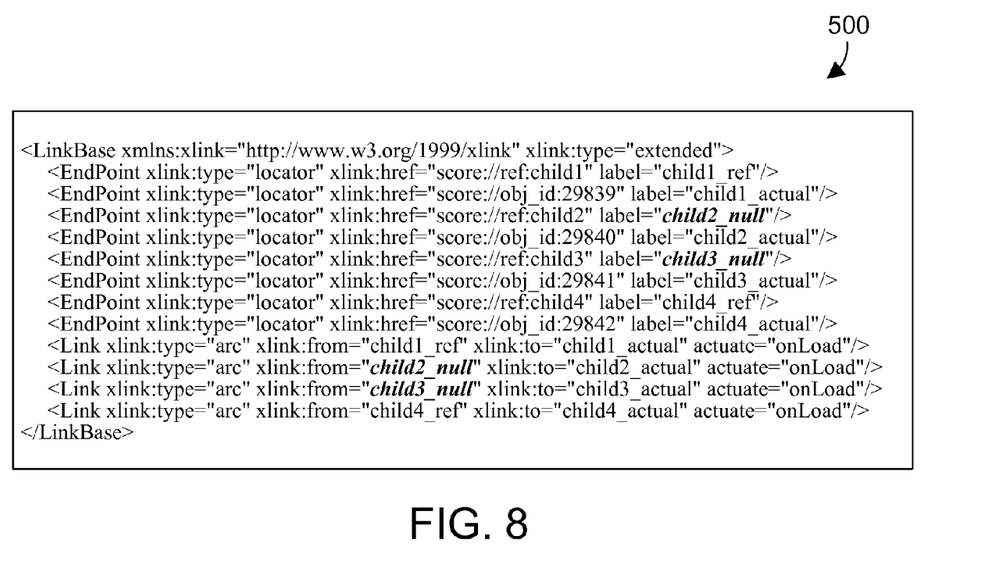
FIG. 8 shows the linkbase 500 in FIG. 5 after two of the voidable links are invalidated due to the corresponding objects not having changed since the last reconstitution, thereby causing the fallback elements in the document to be used without accessing these objects in the repository.

We now look at method 700 with respect to the linkbase 500 in FIG. 5 and the document 200 in FIG. 6. The CMS reads the original links in the link list for the document being reconstituted (step 720). The original links in the linkbase 500 in FIG. 5 reference objects in the repository with an obj_id of 29839, 29840, 29841, and 29842. The repository is then queried to determine which of these objects have not changed since the last reconstitution of the document (step 730). We assume for this simple example that objects 29839 and 29842 have changed since the last reconstitution, and objects 29840 and 29841 have not changed since the last reconstitution. The repository sends to the CMS the list of objects indicating that objects 29840 and 29841 have not changed since the last reconstitution of this document. The voidable links in the linkbase for the objects that did not change are then invalidated (step 750). Referring to FIG. 8, the child2_ref endpoint and link are invalidated by renaming them child2_null, and the child3_ref endpoint and link are invalidated by renaming them child3_null, as shown by the bolded and italicized items in the linkbase 500 in FIG. 8.

We now select the first link 620 in the document 200 in FIG. 6. The link 620 has a reference of child1_ref, which corresponds to child1_actual in the linkbase 500, which corresponds to the original link. The link 620 is therefore valid (step 770=YES), so the corresponding object 29839 is retrieved from the repository (step 780). There are more links to process (step 792=YES), so the next link 630 is selected (step 760). The link has a reference of child2_ref, which corresponds to child2_null in FIG. 8. Because child2_null is not a valid link (step 770=NO), the data in the fallback element 632 is used (step 790) instead of retrieving the data from the object in the repository. There are more links to process (step 792=YES), so the next link 640 is selected (step 760). The link has a reference of child3_ref, which corresponds to child3_null in FIG. 8. Because child3_null is not a valid link (step 770=NO), the data in the fallback element 642 may be used (step 790) instead of retrieving the data from the object in the repository. There is still one more link to process (step 792=YES), so the next link 650 is selected (step 760). The link has a reference of child4_ref, which corresponds to child4_actual in FIG. 8, which corresponds to object 29842. The link 650 is therefore valid (step 770=YES), so the object is retrieved from the repository (step 780). There are no more links in document 200 to process (step 792=NO), so method 700 is done.

The linkbase 500 shown in FIGS. 5 and 8 is a convenient way to provide both voidable and original links in the same data structure. Both voidable and original links are needed so the original links may be determined even after some of the voidable links have been invalidated. Steps 720 and 730 in FIG. 7 use the original links, not the voidable links, to determine whether any of the corresponding objects in the repository have not changed. The linkbase 500 provides a data structure that maintains the list of original links, while also providing indirect, voidable links to the original links.

The simple example in FIGS. 4-8 illustrates the advantages of minimizing accesses to the repository. In this simple example, two of the four accesses to the repository were eliminated by effectively caching the data in the repository into the fallback elements in document 200 in FIG. 6. If half of the accesses to the repository may be similarly eliminated in other documents as well, the number of accesses to the repository will significantly decrease, thereby enhancing system performance.

Other implementations are possible within the scope of the disclosure and claims herein. For example, document 200 in FIG. 6 could use the original links 220, 230, 240 and 250 shown in FIG. 2 instead of replacing the original links with voidable links. We assume for this alternative implementation that a list of original links 220, 230, 240 and 250 is created in a file or other data structure. Once the original links have been stored, the links in the document 200 could be treated as voidable links. Thus, instead of voiding the link child2_ref in FIG. 6, the original link at 230 in FIG. 2 could be modified by replacing the numerical designator 29840 with a value of null or some other defined value that indicates an invalid link. In this implementation, the original links in the document don't necessarily have to be replaced with voidable links. Once the original links have been preserved in a file or other data structure, the original links in the document may be treated as voidable links. This is why step 450 in FIG. 4 specifies to update the elements with voidable links, if needed. With this alternative implementation, the updating of the XInclude elements with voidable links is not needed. We see from this alternative implementation that a link list may not necessarily be a single data structure. The link list for this alternative implementation has the original links 220, 230, 240 and 250 in a file, while the links left in the document 200 are the corresponding voidable links.

The disclosure and claims herein disclose a way for a CMS to minimize accesses to the repository. A document is processed a first time to add fallback elements that contain data read from the repository, and to make sure the links in the document are voidable. When the document is to be reconstituted a subsequent time, the repository is consulted to determine which of the objects corresponding to the original links in the document have not changed. For those links that have corresponding objects that did not change, the voidable link is invalidated, causing the CMS to use the data in the fallback elements when the invalid link is processed. By using the fallback elements in a document as a cache for objects in the repository, only the objects that changed since the last document reconstitution need to be accessed in the repository. The objects that did not change may be accessed by using the data in the fallback elements.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future.

What is claimed is:

1. An apparatus comprising:
   at least one processor;
   a memory coupled to the at least one processor;
   a repository in the memory that includes a plurality of objects; and
   a content management system residing in the memory and executed by the at least one processor, the content management system comprising:
   a voidable link mechanism that upon initial reconstitution of a document in the repository, retrieves from the repository objects corresponding to original links in the document, stores values from the retrieved objects in corresponding fallback elements in the document, generates a list of original links and voidable links to objects referenced by the original links in the document, and replaces any original links in the document that are not voidable links with corresponding voidable links, wherein the voidable link mechanism, upon subsequent reconstitution of the document, determines the original links in the list, queries the repository to determine which of the objects corresponding to the original links in the list have not changed since the last reconstitution of the document, and for each object that has not changed since the last reconstitution of the document, the voidable link mechanism invalidates the corresponding voidable link.

2. The apparatus of claim 1 wherein the document is an XML document and the original links comprise XInclude elements in the XML document.

3. The apparatus of claim 1 wherein the content management system is unable to resolve a voidable link that has been invalidated, thereby causing the content management system to use the fallback element corresponding to the voidable link as the value for the voidable link.

4. The apparatus of claim 1 wherein, if a voidable link in the document is valid, the content management system accesses the corresponding object in the repository using the voidable link.

5. A computer-implemented method for reconstituting a document in a repository in a content management system, the method comprising the steps of:
   during initial reconstitution of the document, performing the steps of:
   (A) retrieving from the repository objects corresponding to original links in the document;
   (B) storing values from the retrieved objects in corresponding fallback elements in the document;
   (C) generating a list with the original links in the document and corresponding voidable links; and
   (D) replacing any original link in the document that is not voidable with a corresponding voidable link defined in the list,
   during each subsequent reconstitution of the document that follows the initial reconstitution of the document in steps (A) through (D), performing the steps of:
   (E) determining the original links in the list for the document;
   (F) querying the repository to determine which of the objects corresponding to the original links in the list have not changed since the last reconstitution of the document; and (G) for each object that has not changed since the last reconstitution of the document, invalidating a corresponding voidable link.

6. The method of claim 5 wherein the document is an XML document and the original links comprise XInclude elements in the XML document.

7. The method of claim 5 wherein the invalidation of the corresponding voidable link in step (G) causes using the fallback element corresponding to the voidable link as the value for the voidable link when the document is reconstituted.

8. The method of claim 5 wherein, if a voidable link in the document is valid, performing the step of accessing the corresponding object in the repository using the voidable link.

9. A method for deploying computing infrastructure, comprising integrating computer readable code into a computing system, wherein the code in combination with the computing system perform the method of claim 5.

10. A computer-implemented method for reconstituting an XML document in a repository in a content management system, the method comprising the steps of:
(1) upon an initial reconstitution of the XML document, performing the steps of:
　(A) retrieving from the repository objects corresponding to XInclude elements in the XML document;
　(B) storing values from the retrieved objects in corresponding fallback elements in the XML document;
　(C) generating a linkbase with original links and voidable links to objects referenced by the XInclude elements in the XML document;
　(D) replacing original links in the XInclude elements in the XML document with corresponding voidable links defined in the linkbase;
(2) upon subsequent reconstitutions of the XML document, performing the steps of:
　(E) determining the original links in the linkbase;
　(F) querying the repository to determine which of the objects in the repository corresponding to the original links in the linkbase have not changed since the last reconstitution of the XML document; and
　(G) for each object that has not changed since the last reconstitution of the XML document, invalidating the corresponding voidable link in the linkbase.

11. The method of claim 10 wherein the invalidation of the corresponding voidable link in step (G) causes the content management system to use the fallback element corresponding to the voidable link as the value for the voidable link when the XML document is reconstituted.

12. An article of manufacture comprising:
(A) a content management system comprising:
　a voidable link mechanism that upon initial reconstitution of a document in a repository, retrieves from the repository objects corresponding to links in the document, stores values from the retrieved objects in corresponding fallback elements in the document, generates a list with original links and voidable links to objects referenced in the document, and replaces any original links in the document that are not voidable with a corresponding voidable link, wherein the voidable link mechanism, upon subsequent reconstitution of the document, determines the original links in the list, queries the repository to determine which of the objects corresponding to the original links in the list have not changed since the last reconstitution of the document, and for each object that has not changed since the last reconstitution of the document, the voidable link mechanism invalidates the corresponding voidable link; and
(B) computer-readable media bearing the content management system.

13. The article of manufacture of claim 12 wherein the document is an XML document and the original links comprise XInclude elements in the XML document.

14. The article of manufacture of claim 12 wherein the content management system is unable to resolve a voidable link that has been invalidated, thereby causing the content management system to use the fallback element corresponding to the voidable link as the value for the voidable link.

15. The article of manufacture of claim 12 wherein, if a voidable link is valid, the content management system accesses the corresponding object in the repository using the voidable link.

\* \* \* \* \*